United States Patent [19]
Voigt et al.

[11] 4,117,063
[45] Sep. 26, 1978

[54] PROCESSING A GRAFT POLYMER OR ELASTOMER

[75] Inventors: Herman Uwe Voigt; Martin Völker, both of Langenhagen; Hans Peter Stehmann, Fuhrberg, all of Fed. Rep. of Germany

[73] Assignee: Kabel-und Metalwerke Gutehoffnungshutte AG., Hanover, Fed. Rep. of Germany

[21] Appl. No.: 642,764

[22] Filed: Dec. 22, 1975

[30] Foreign Application Priority Data

Dec. 12, 1974 [DE] Fed. Rep. of Germany ....... 2458776

[51] Int. Cl.² ............................................. C08F 29/12
[52] U.S. Cl. .................... 264/102; 260/827; 264/40.7; 264/174; 264/176 R; 264/236; 264/349
[58] Field of Search ............... 264/331, 101, 102, 174, 264/176 R, 236, 328, 349, 40.1, 40.7; 260/827; 526/29

[56] References Cited
U.S. PATENT DOCUMENTS

| | | | |
|---|---|---|---|
| 3,075,948 | 1/1963 | Santelli | 260/827 |
| 3,155,750 | 11/1964 | Dahn, Jr. et al. | 264/40.7 |
| 3,235,640 | 2/1966 | Carton et al. | 264/101 |
| 3,503,943 | 3/1970 | Kresge et al. | 526/29 |
| 3,644,315 | 2/1972 | Gardner et al. | 526/29 |
| 3,646,155 | 2/1972 | Scott | 260/827 |
| 3,830,872 | 8/1974 | Schrage et al. | 260/827 |
| 3,936,523 | 2/1976 | Kleeberg et al. | 264/211 |
| 3,957,719 | 5/1976 | MacKenzie, Jr. | 264/174 |
| 3,960,802 | 6/1976 | Beers et al. | 264/102 |

*Primary Examiner*—Jeffery R. Thurlow
*Attorney, Agent, or Firm*—Smyth, Pavitt, Siegemund, Jones & Martella

[57] ABSTRACT

A cross-linking polyolefine, preferably a polyethylene powder is mixed with a silane solution (containing additives, such as a graft initiator, activator and anti-oxidant) and heated while worked, so that the wetted powder melts. The silane solution can also be blended into the melting powder. Grafting occurs in the melt and the stream of molten material is then degassed, while still warm in the final work shaping device, e.g. an extruder jacketing a conductor. The resulting product (to the extent it consists of the said material) will then cross-link.

25 Claims, 3 Drawing Figures

PROCESSING A GRAFT POLYMER OR ELASTOMER

BACKGROUND OF THE INVENTION

The present invention relates to a method for making a thermoplastic or elastomeric product which will cross-link in the presence of moisture on the basis of silane or silane compounds which have been grafted onto the thermoplastic or elastomeric macramolecules.

The German printed patent application 1,963,571 discloses a method for cross-linking polyolefine e.g. polyethylene or a mixed polymer in the presence of a compound which is capable of producing free radicals in the olefin macromolecules. A silane compound of the formula $R\ R°\ Si\ Y_2$ is grafted onto the polyethylene macromolecules, whereby R is a mono-valued olefinically unsaturated hydrocarbon or hydrocarbon oxigroup; Y is an alcoxi-,acyloxi-,oxime- or a substituted amino group; and $R°$ is either a group R or a group Y or methylene. The silane is grafted upon the macromolecules of the olefine in an extruder and at a temperature in excess of 140° C. The extruder kneads and masticates the material and mixes its components. After the material has resided in the extruder for a certain period of time, the grafted polymer is extruded, granulated and stored. The grafted polymer powder may be mixed later with a catalyst batch, extruded as to the final shape, and the resulting product is then placed into hot water to obtain cross-linking.

These known methods are characterized by a relatively large number of individual steps, such as mixing, grafting, granulating, etc. Moreover, it was found that the material may to some extent cross-link prematurely, i.e. prior to obtaining its final shape. This is particularly so, for example, during cooling of the granulate. Thus, the final product is not always satisfactory. For example, the material may be used to jacket an electrical cable, and the jacket requires particular mechanical as well as electrical properties. As to the latter aspect, it is particularly disadvantageous that the known method results in pockets in the material after having been shaped. The insulative properties are, therefore, locally quite weak, so that, for example, the voltage that can be transmitted is limited. As regards the mechanical properties, the formation of gas pockets may render the surface quite rough, and the jacket, for example, can wear rather rapidly.

DESCRIPTION OF THE INVENTION

It is an object of the present invention to process a thermo-plastic of elastomeric material whose macromolecules have been grafted with a silane compound for later cross-linking in the presence of water.

It is another object of the present invention to process material that will cross-link, but which requires processing without e.g. premature cross-linking or other kinds of interference to obtain a higher quality product.

It is, therefore, a further object of the present invention to provide for a new method and equipment to make products of thermoplastic or elastomeric material which will later cross-link after having been shaped into the final form.

It is a specific object of the present invention to provide a new and improved method for jacketing electrical conductors.

It is a specific object of the present invention to process a thermoplastic or elastomeric material to which a graft additive and, possibly, other compounds have been added.

In accordance with the preferred embodiment of the invention, it is suggested to mix and work, e.g. masticate and knead or extrude base material (elastomeric or thermoplastic) and a silane or silane compound of the type outlined above, to produce a flow of a melted mixture in which the graft reaction occurs, and to degas the material, while still warm and flowing, immediately prior to forming and shaping the mixture into the final form, which it will be made to retain later by cross-linking. Specifically, the degassing step is to be carried out after completion of grafting. Thus, it is a specific feature of the invention that the material, grafted for subsequent cross-linking, is neither granulated nor stored, but the warm stream of material is degassed up to the point in time in which it is e.g. form-extruded.

The inventive method is to be practiced with specific advantage for insulating e.g. cable, not only low voltage cable (up to one kilovolts), but also for cable which transmit 10 kilovolts or even more. Even if the cable insulation is to be relatively thick, vigorous degassing will avoid formation of any pockets. The method can also be used e.g. for making plastic tubes or other products.

It is of specific advantage to combine the adding of the silane or of a silane compound to the base material with the adding of additional substances needed and/or desirable for grafting and/or for the final product. The silane plus additives is a solution which may either be added to the elastomeric or thermoplastic base material as it is worked and melts, or the said solution may be used to wet the powdery base material, as it is charged into the working device. In either case, mixing of the plastic with the silane and homogenizing the mixture by working it through, i.e. by kneading, extruding and/or masticating may be combined so that a homogenic mixture of the gradually melting plastic with all the other additives and the silane is obtained in a single step, and a continuation of the treatment of the material at rising temperature will result in the grafting of the silane onto the macromolecules of the base material at such temperature.

By way of example, a thermoplastic material, such as polyethylene has to be blended with a silane compound for grafting. The grafting, however, requires the adding of e.g. peroxide for graft initiation. The peroxide, e.g. an esterperoxide, will decay later thermally and furnishes the radicals needed to graft the silane onto the polyethylene macromolecules. A typical example here is e.g. dicumyl peroxide or, preferably, an ester peroxide having a low crosslinking effectiveness, because the principal function of the peroxide is to obtain the silane grafting. For example, one may use here tert.-butylperoxi-isonanoate with 1,3 bis (tert.-butylperoxi-isopropyl) benzene. This graft initiator is to be added at about 0.05 to 0.5 parts by weight per 100 parts base plastic material.

Additionally, an activator will be added, e.g. a polyfunctional monomer, such as triallylcyanurate, divinyl benzene, ethylene dimethycrylate or triallylphosphite. One needs here about 0.01 to 10 parts by weight per 100 parts base polymer. Another additive is an anti-oxidant, preferably being a substance that can also be grafted onto the macromolecules to remain stably in the final product so as to provide permanently protection against oxidation. One may use here an oligomer or monomer of 2, 2, 4 Trimethyl-dihydroquinoline at about 0.05 to 2 parts, preferably less than 0.5 parts by weight per 100 parts of the base polymer. Specific anti-oxidants to be used in this capacity with advantage are, for example, the following. Certain derivatives of the 2, 2, 4 trimethyl-dihydroquinolines are traded under the designation Anox HB, Flectol H and Agerite resin D. Other anti-oxidants include specifically the monomer quinoline derivatives, such as 6-ethoxy-2,2,4-trimethyl dihydroquinoline (also called Santoflex AW) and the 6-dodecyl 2,2,4-trimethyl dihydroquninoline (also called Santoflex DD). The last two substances have the specific advantage that they are liquidous at room temperature and can be particularly easily and homogenously distributed in the base polymer.

Still other additives are those which will develop water internally in the material for obtaining the cross-linking. Also, a condensation catalyst, e.g. dibutyltin-dilaurate or a heavy metal salt or a long fatty acid can be added. However, for reasons of avoiding premature cross-linking it may be advisable to add the catalyst after degassing, just as the material is made to assume its final shape. This is particularly so if the catalyst is provided for accellerating a silanol condensation reaction.

As stated, these various components (plastic, silane, additives) are intimately mixed, homogenized and heated so that the plastic melts and a homogenized molten mixture results. The initial phase or operation may include separately metering quantities of plastic powder and of the silane with additives, and these metered quantities are combined (added together) in the entrance of the mixing device and processed together thereafter under continuous homogenization and gradual heating and melting.

Generally speaking and in the preferred form of practicing the invention, the various components should be mixed and worked within a very small spectrum of their individual dwell and residence times in the equipment so that all parts of all components are uniformly and homogenically distributed throughout the mixture. Working, moreover, should be carried out gently under avoidance of peak temperatures, even temporary ones, particularly to avoid any premature cross-linking.

Alternatively, the silane with additives may be added in steps to the worked, heated and melted plastic to obtain a gradual buildup of the silane and additive content. In either case, the molten mixture is homogenized and the silane is grafted onto the macromolecules of the base material when the necessary temperature has been reached. The working temperature should be in excess of 160° C, but not higher than about 250° C, except that a temperature of up to 270° may temporarily be permitted; preferably one will work in the range from 180° to 230° C. The graft initiation decays at these temperatures so that grafting is obtained, indeed.

The flowing, viscous, grafted material is amenable to develop gas if that gas is permitted to remain. Pockets may be generated by excess silane or otherwise in the final product. Thus, the gas causing and filling these pockets has to be removed before the pockets can be formed and set. This is the reason for degassing the warm flowing mixture, which has been worked through, homogenized and grafted. Thus, the flow of grafted material is subjected to a low pressure, such as 1 to 200 Torr, preferably, however, 20 to 50 Torr, while still being warm, having a temperature of 130° to 240° C, preferably about 200° C.

The material flows directly from the low pressure zone of degassing to the form-shaping device, such as an extruder head. The degassing involves, as stated, the removal of excess silane, but also volatile peroxide reaction product (following the grafting) air and other impurities. The resulting product is free from gas and other inclusions that could form pockets. The resulting product has, therefore, more uniform properties and is very suited for high voltage insulation. The work shaping tool is, for example, an extruder and the low pressure zone for degassing may be provided for in the entrance or feeder section of the extruder, from which an extrusion screw moves the degassed material to the extruder head.

The feeder section of this extruder is preferably connected to the outlet of a kneading and masticating machine, which is charged with the base material and into which is fed the silane solution, for example, in steps to stepwise enrich the content of base material with silane plus additives. Since the amount of liquid to be added (silane solution plus additives) is relatively small, graduated stepwise feeding in a continuous process of melting the plastic is quite advantageous, regarding homogenization. In this case, at least some of the silane solution is fed into the already melted - worked plastic.

Alternatively, the mixing and working device may be a second extruder being charged through metering devices with the various components. This second extruder serves as kneading and masticating machine and has along its screw a mixing zone and a grafting zone at elevated temperatures. The extruders may form an L-shaped configuration.

Grafting occurs in either case in the portion of the homogenizing machine or device close to the outlet as connected and leading to the degassing zone, and the kneading device gradually increases the temperature of the mass to 180° to 250° C, possibly even to 270° C. Degassing is then carried out at the temperature the flowing melt has as emerging from the kneading and masticating device.

In order to enhance degassing, it may be advisable to cause the warm material to flow in several streams so as to increase the surface/volume ratio. Following degassing the material should move promptly and completely to the final work shaping tool. Any stagnation should be avoided, and material not moving in the desired direction towards the final shaping tool should be caused to move out of the equipment. Stagnating material may become crusty and even char, and flakes may then be mixed with good material thus ruining the product. In the case of an extruder, the rear portion of the screw may have reverse flights.

As far as equipment is concerned, the preferred form of practicing the invention involves a combined mixing and working (masticating) tool, which feeds into the degassing chamber, which, in turn, is the feeder inlet or the like of the work shaping tool. As to the latter combination, immediacy of shaping following the degassing is of the essence. As to the preliminaries, however, it should be mentioned that mixing, melting and grafting may be carried out in separate devices but on a continuous basis as far as melting and grafting-during-working is concerned.

It may be advisable to control the rate of feeding mixed and grafted material in dependence upon the pressure in the degassing zone as too high a feeder rate may result, initially, in too strong a gas development so that the pressure increases too much which in turn will retard and impede the degassing. Therefore, it is advisable to provide a feed-back loop which retards the mass flow if the pressure in the degassing zone increases too much.

The base material is preferably provided in powdery and granulated form. The silane, preferably with the additives in solution is mixed with the powder, e.g. in a funnel-shaped hopper feeding a mixing extruder (which is the mixing and masticating machine). The powder may be metered through a conveyor belt weigher and the liquid may be metered through a pump; both devices may operate continuously or intermittently to obtain metered batches of fixed ratios of the several components, which are then gradually fed to the kneading device. In either case, the powder is wetted with the silane solution, and the residence time of all parts is the same throughout the subsequent homogenization, melting and grafting.

Additionally or alternatively, the powdery base material may be mixed with the silane and additives prior to working, using e.g. an agitator operating at 500 to 3000 RPM, so that prior to melting and working the liquidous components diffuse into the powder particles. Continued agitation raises the temperature to enhance diffusion and to maintain the wet powder in a fluidized state with uniform distribution of wetness to obtain uniform diffusion. The material may then be melted and masticated to obtain the grafting which is then followed by degassing and shaping.

As stated, the mixer may be charged intermittently or on a continuous basis and may be included in a funnel or hopper that feeds, e.g. the melting-grafting extruder. The base material when in a granulated or powdery state will be wetted by the added silane plus additives solution and mixing occurs already in the hopper. The amount of liquid added is relatively small, so that the liquid should wet all of the grainy or powdery particles. Intimate mixing is, therefore, quite important.

It should be noted that upon feeding the plastic powder and the silane solution concurrently into the receiving hopper of the kneading machine or device one obtains an interaction between just added material and wetted granular material further down in the funnel or hopper. The latter material produces some evaporation of the liquidous portion, but the vapor condensates on the just added powder, thereby cooling the latter. Also, this way no portion of the added material (silane plus graft producing and enhancing additives and others) will be lost. This phenomenon occurs also if there is no agitation in the funnel, but if mixing is carried out only in the first portion of the masticating tool.

DESCRIPTION OF THE DRAWINGS

While the specification concludes with claims particularly pointing out and distinctly claiming the subject matter, which is regarded as the invention, it is believed that the invention, the objects and features of the invention and further objects, features and advantages thereof will be better understood from the following description taken in connection with the accompanying drawings, in which:

Proceeding now to the detailed description of the drawing, FIG. 1 illustrates a mixing, kneading and masticating machine 1. This machine has an entrance chamber 13 driven by a motor 12 via a suitable transmission and a speed reducing gear 11, which is or includes a hopper and, possibly, an agitator to retain the powder in a fluidized state. The hopper receives the granulated or powdery base material, e.g. polyethylene from a source for such material. The various additives, such as silane or a silane compound, a peroxide, an activator, possibly, but not necessarily a condensation catalyst and, possibly, an anti-oxidant have been previously blended into a solution and are fed to the chamber via ducts and inlets 2. Some of the additives may already be added to the base material prior to entry in kneading machine 1.

Figure 1:
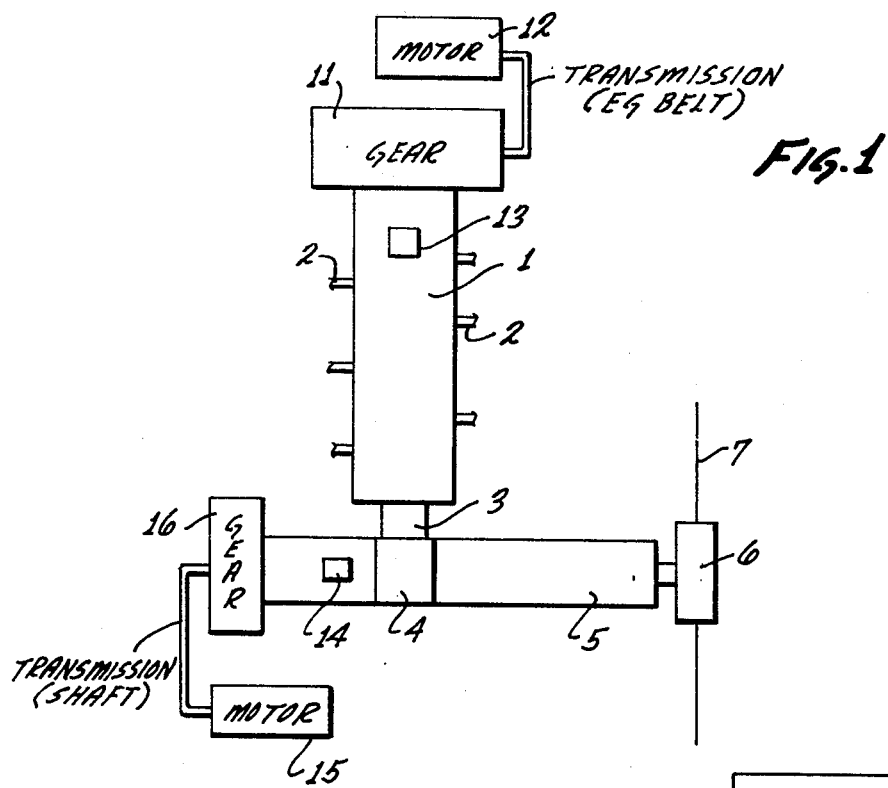
FIG. 1 is a schematic view of equipment in accordance with a first example for practicing the invention in accordance with the preferred embodiment.

A mixing and kneading machine very suitable for this purpose is, for example, a so-called "Buss-Kno-Kneter" which is used generally for working and homogenizing granulated material. This machine includes a mixing and working chamber containing a threaded worm or screw which rotates and undergoes also a reciprocating movement. The worm proper has a shaft with wing elements cooperating with stationary teeth which project from the chamber wall, of course, on the inside thereof. The feeder ducts 2 for the additives preferably run into the fixed teeth inside of chamber 1, which is the reason for the staggered arrangement.

Rotation and reciprocation of the worm results in a coaction with the stationary teeth which kneads and masticates the material fed thereto and mixes intimately its components. The working, possibly supplemented by auxiliary heating, raises the temperature to between 160° to 250° C, preferably between 180° and 230° C. The silane solution is added in steps through the various ducts and is thereby blended with the melted plastic in relatively small quantities in each instance of feeding, so that the silane and additive content in the plastic is enriched in steps. Therefore, the silane solution is added to the plastic to a considerable extent when the plastic is already in the melted state. The result is a homogenic mixture which is obtained rather speedily. Moreover, the peroxide decays thermally and gives off radicals which cause grafting of the silane and of the oxidant onto the macromolecules of the plastic.

If the material is worked at the range of about 180° C, it will have a temperature when emerging from chamber 1 through outlet 3 of about 200° C to 210° C. The material thus heated and homogenously mixed (grafting having been at least substantially completed) is fed to a degassing chamber 4 being the entrance chamber of an extruder 5. Degassing results from maintaining a rather low pressure in that chamber, preferably below 100 Torr. The preferred operating range is about 20 to 50 Torr. As a consequence, all trapped gas, particularly excess (i.e. not grafted) silane is, in effect, pumped out by operation of a pump 14, which may be connected to the extruder 5 in lieu of the usual hopper. A rather wide range of temperature is permissible here, such as from 130° to 240° C. However, about 200° C are preferred for degassing.

The feed screw extruder 5 is driven also here by a motor 15 via a shaft and a speed reducer gearing 16. Extruder 5 serves as the tool for shaping the material in final shape prior to cross-linking. By way of example, the extruder may be constructed so that an electric conductor 7 passes through the extruder head 6, and a jacket or envelope is extruded about that conductor. The extruded product is free from pockets and trapped gaseous impurities. The jacket will have a very smooth surface as trapped gas bubbles, which could pop right on the surface, have not formed. Also, since internal, gas-filled pockets are substantially absent, the mechanical and electrical properties are about as predicted on the basis of impurity-free material.

The jacketed conductor may then be stored, e.g. in water to obtain cross-linking. However, additives to the base material may have included a compound which yields water. Examples are disclosed here in copending application S.N. 611,519 of common assignee now U.S. Pat. No. 4,048,129, issued Sept. 13, 1977.

Figure 2:
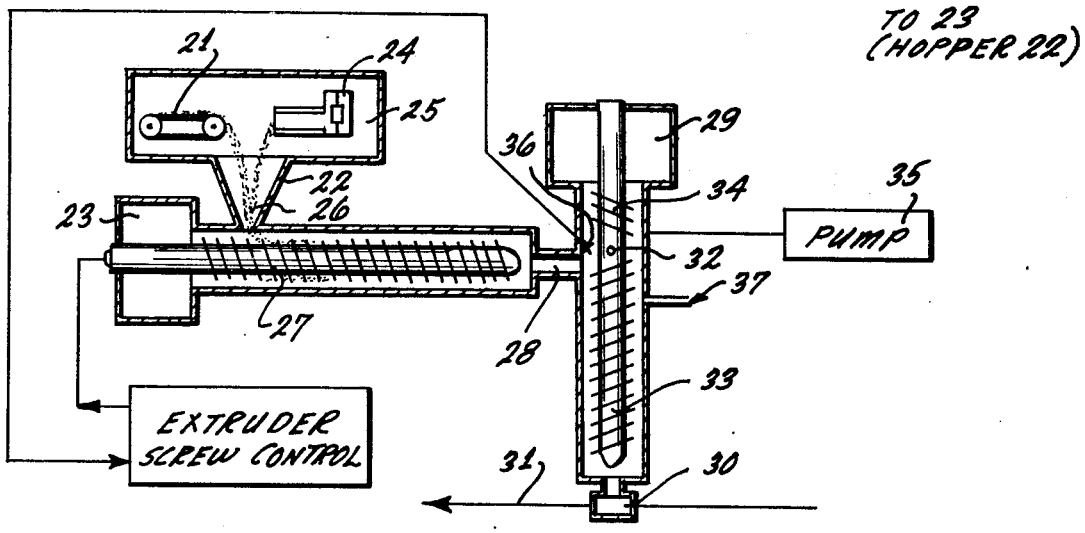
FIG. 2 is a schematic view of equipment representing the best mode for practicing the preferred embodiment of the invention.

It was found that the following material is best suited for a cable jacket:

Polyethylene (MJ 8); 100 parts by weight
2,2,4 Trimethyl-dihydroquinoline; 0.5 parts by weight
Tert. butylperoxi-isononoate; 0.2 parts by weight
1,3 Bis (tert. butylperoxi-isopropyl) benzene; 0.02 parts by weight
Vinyl-trimethoxysilane; 2.0 parts by weight
Triallylcyanurate; 0.1 parts by weight
Dibutyltindilaurate; 0.05 parts by weight Proceeding now to the description of FIG. 2, there is shown a metering device 21, by means of which base material e.g. an olefinepolymerisate or a mixed polymerisate of olefines is dispensed at a metered rate and into a funnel or hopper 22. The preferred material used here is also polyethylene which may be dispensed onto the metering device 21 in granulated consistency.

The hopper 22 is fed additionally with additives by means of a pump 24 which feeds silane in liquid form to the funnel or hopper 22. The rate of feeding is controlled so that it is commensurate with the rate of feeding of powdery base material. One will use about 0.5 to 10 parts of silane per 100 parts (by weight) of base polymer, e.g. polyethylene. The silane solution will thereby wet the powder particles as the silane drips into the powder. Some of the silane will evaporate, particularly as the wetted powder drops deeper into the funnel. However, the silane vapor will recondensate on the powder particles that follow from above, so that these particles serve as a kind of feedback coolant for the silane that continues to drip onto these following particles.

Concerning the additives, they should include a free radical initiator, such as a peroxide at an amount of 0.05 to 0.5 parts by weight per 100 parts by weight base polymer (see example above). Another additive needed (and to be mixed with the silane) is an activator and here one may use a polyfunctional monomer of the type mentioned above.

Another additive to be included in the silane solution is an anti-oxidant and here particularly one that can also be grafted onto the macromolecules of the base material. One should use here an oligomer or the monomer of the 2, 2, 4 trimethyl dihydroquinoline. Such compounds include a rather reactive C-C double bond which permits radical grafting on the hydrocarbon chain of the polymer of the base material. This way, the stabilizing molecule (anti-oxidant) will be fixed to the macromolecules of the highly polymerized granulate or powder and thus cannot migrate out of the material or volatilize; it will be permanently present in the final product and provides lasting protection against oxidation.

As stated, all those additives (except, preferably, a condensation catalyst and water producing substances) are included in the silane solution, which is dispensed onto the polyethylene powder in funnel or hopper 22 by means of pump 24. A casing 25 encloses the equipment 21 and 24, and funnel 22 is the exit of casing 25. The casing should seal these parts gas-tight as no substance should be permitted to evaporate and escape.

Funnel or hopper 22 is also the inlet to a first extruder 23. The funnel or hopper 22 may include a stirrer to provide for continuous agitation of the wet powder. One may use here a grooved sleeve as part of the funnel 22 to make sure that the wet granulate or powder 26 advances properly into the extruder 23. The extruder 23 has a barrel or cylinder whose diameter D is about 150 mm and which is 25 × D long. As a rule, this extruder is at least 20 × D long but may have a length of up to 30 D.

The powder or granulate 26 wetted with silane solution is now intensively mixed by means of the rotating feed screw 27 of extruder 23. The material is additionally heated and melts, so that the flowing material becomes very homogenically mixed. Melting occurs rather gently. Mixing and melting occurs in the first range of the extruder (as seen from the inlet funnel 22) and having length of about 6 D to 10 D. The temperature here is about 120° to 170° C. The second extruder range, being about 24 to 10 D long is provided for grafting. At a distance about 8 D from the hopper 22 and further the temperature has risen to at least 180° C and may continue to rise up to 270° C.

The extruder 23 is laterally connected to a second extruder to establish an L-shaped two-extruder configuration. The connection is denoted by numeral 28 and constitutes an outlet nozzle of extruder 23. Actually, this nozzle may be comprised of multiple openings for extruding plural streams of flowing mixture to increase the surface of that material in relation to the volume. The connection is made, e.g. by flanging the first extruder to the second extruder 29 at a point being about 3 to 4 D in the extruder cylinder or barrel of the second extruder 29. This second extruder may have also a diameter of 150 mm but its length is somewhat shorter, namely about 15 D.

The entrance portion of extruder 29, i.e. that zone into which extruder 23 feeds, is established as degassing chamber 32. That chamber 32 is connected to a pump 35, which maintains a pressure of 1 to 200 Torr. The pump discharges the gas that emerges from the material. A pressure transducer 36 is provided to monitor the pressure in chamber 32 and controls the feeding of extruded, grafted polymer into the degassing zone. The purpose thereof is that if too much material is fed by extruder 23 the pressure in chamber 32 will rise (e.g. at top rate of operation of the pump 35) and degassing will become insufficient. Thus, the feeding should be retarded. In view of the inherent delay between changes in the rate of feeding extruder 3 and the effective change in flow at outlet 8, the response pressure for throttling the feeding should be comfortably below the permissible maximum.

The material is additionally homogenized in extruder 29 as the feed screw 33 thereof advances the material to the extruder head 30, being also constructed for passage of a conductor 31, about which a jacket is being extruded. At 37 a catalyst and water releasing or producing substances may be added. The extruder 29, therefore, serves additionally as homogenizing and mixing machine as to these additives, while the temperature remains or is kept rather high (about 200° C or even higher). The catalyst to be added is a hydrolysis or condensation catalyst, such as dibutyltindilaurate or a heavy metal salt or a long chain fatty acid. It is safer to add the condensator catalyst after the degassing of the silane grafting polymer, because this particular additive is not needed to obtain grafting of the silane. About 0.5 to 10 parts by weight catalyst per 100 parts of base material should be used.

The other additive which may be charged during form-extruding is of the type which forms water by chemical reaction, for example, stearic acid or adipin acid together with a non-hygroscopic material, such as tin oxide or zinc oxide. As these materials react, water and an indifferent reaction product (e.g. a metal salt) is produced. However, the reaction time of water formation is rather slow, so that even if these additives are included already in the base material or even in the silane solution, very little premature cross-linking will occur. The reaction will occur primarily after the composite material has been form-extruded and the water as developed will cause the cross-linking. This additive is added at a proportion of 0.05 to 5 parts by weight per hundred parts base polymer. Irrespective of the inclusion of a water releasing additive, the extruded jacket is caused and/or permitted to cross-link subsequently to leaving the extruder head which amounts to a stabilizing step as to the shape this product has obtained during this second extrusion.

It can thus be seen that the equipment provides for a direct sequence of these operational steps, including mixing-homogenization, grafting, degassing, and form-extruding, whereby also here a degassing step separates the grafting from extruding, but the latter follows immediately the degassing. As a consequence of vigorous degassing as preceded by extensive homogenization of the blend, the insulation jacket may well have thickness not much, if at all, above the theoretical minimum for the particular material.

In order to avoid accumulation of material at the back of the worm, which could crust or even burn, flake off and mix with regular material, the extruder 29 is constructed to remove such material. Accordingly, the rear portion 14 of the worm has threads which are reversed flights, i.e. the screw threads have opposite pitch. Thus, any material not advanced towards the extruder head 10 is advanced in the opposite direction and removed.

Figure 3:
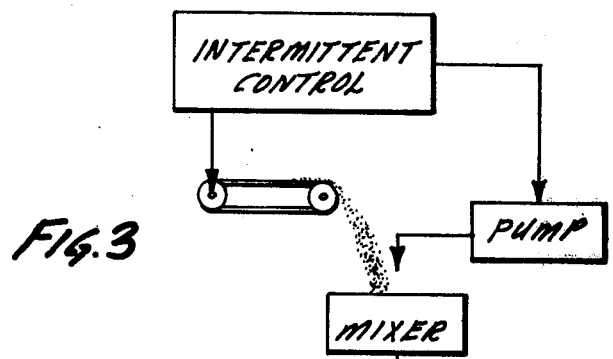
FIG. 3 shows a modification of the device of FIG. 2.

FIG. 3 shows that the feeding of extruder 23 can be provided for in a somewhat modified version. Both, the weighting conveyor 21 and the feed pump 24 work intermittently and feed fixed quantities into a mixer 40, which homogenizes the powder-silane solution to obtain a homogenically wet powder amounting in effect to a coating of the polyethylene particles with silane solution. The content of this mixer 40 is then discharged into the hopper of extruder 23, from which it is gradually drawn into the extruder 23. In the meantime, a new batch is prepared through metering the proper amounts of powder and silane solution, mixed in the mixer and held in readiness for replenishing the hopper content.

The invention is not limited to the embodiments described above but all changes and modifications thereof not constituting departures from the spirit and scope of the invention are intended to be included.

We claim:

1. In a method of continuously making a product of a thermoplastic or elastomeric material which is to cross-link subsequent to shaping the material into said product, wherein the thermoplastic or elastomeric base material and silane or a silane component are provided at a metered relation to the base material for purposes of grafting and ultimate cross-linking; and the thus provided thermoplastic or elastomeric base material is mixed with the silane or a silane compound at a ratio to permit grafting of the silane or silane compound, resulting in a mixture; the improvement comprising an uninterrupted sequence of the following steps:

mechanically working the resulting mixture at a temperature in excess of 140° C to homogenize the melting mixture while obtaining said grafting;

degassing the still warm, worked, grafted mixture following immediately the working step as flowing from the working; and immediately after degassing forming the still flowing and degassed mixture into the said product, the product cross-linking subsequently in the presence of moisture.

2. Method as in claim 1, wherein the mixing precedes the working but includes agitation of the mixture the base material being provided as powder or in granular consistency.

3. Method as in claim 1, wherein the mixing is combined with the working, the silane or silane compound being added while the material is worked and melts.

4. Method as in claim 1, wherein at least the working is carried out at temperatures between about 160° to about 250° C.

5. Method as in claim 1, wherein the degassing is obtained by subjecting the mixture to a low pressure from 1 to 100 Torr.

6. Method as in claim 1 including mixing additives to the material, the additives including at least some of the following: a graft initiator, a graft activator, an anti-oxidant, and a condensation catalyst.

7. Method as in claim 6, including the step of adding the catalyst after the degassing step.

8. Method as in claim 6, wherein the additives, the silane and the material are mixed together simultaneously.

9. Method as in claim 6, wherein said additives are mixed with the silane or silane compound, the mixture being added to the material.

10. Method as in claim 9, said base material having a powdery or granular consistency, said silane plus additive mixture being a liquid which wets the particles of the base material and being added to the powdery consistency in the beginning of mixing.

11. Method as in claim 9, said base material being powdery and granular, said silane plus additive mixture being at least in parts added to the powdery or granular material while being already worked and melted.

12. Method as in claim 1, wherein the working step includes production of a continuous viscous stream of the melted mixture, the stream being degassed as per the degassing step.

13. Method as in claim 12, including the step of dividing the stream for degassing to increase the relative surface of the mixture through which flows the gas as per the degassing step.

14. Method as in claim 12 and including the step of controlling the flow of the stream in dependence upon the pressure in a zone in which the degassing step is carried out.

15. Method as in claim 1, wherein the forming step includes extruding the degassed mixture using an extruder, the degassing being carried out by maintaining a low pressure in an entrance section of the extruder for the worked mixture.

16. Method as in claim 1, wherein the forming process includes advancing the mixture from a zone of degassing to a zone of forming, the method further including the step of removing stagnating material from the zone of degassing in the opposite direction.

17. Method as in claim 1 and including the step of intermittently metering descrete quantities of the base material and of the silane or silane compound, the mixing step being carried out on the metered quantities.

18. Method as in claim 1 operated on a continuous basis at least as far as said working, degassing and forming steps are concerned, and including feeding for working on the basis of pressure during degassing.

19. Method as in claim 1, wherein the degassing is obtained by subjecting the mixture to a low pressure from 20 to 50 Torr.

20. In a method of continuously making a product of a thermoplastic or elastomeric material which is to cross-link in the presence of moisture subsequent to shaping the material into said product, wherein the material is provided in granular or powdery consistency and wetted with a silane solution which includes additives for grafting the silane onto the macromolecules of the material, the silane solution having the required ratio for grafting, the improvement comprising:

working while heating the wetted material into a melted homogenized fluid having a temperature to obtain the grafting;

exposing the grafted fluid to a low pressure for degassing; and immediately after the degassing shaping the fluid into the product in which the material will cross-link in the presence of moisture.

21. In a method as in claim 20, said working being extruding the wetted material.

22. In a method as in claim 20, said shaping being extruding the grafted fluid, the degassing being carried out in a feed zone for the extruding.

23. In a method as in claim 20, including the step of blending the wetted granular material prior to working and melting.

24. In a method as in claim 1, wherein the forming step is comprised of extruding a sheath of the grafted and degassed mixture upon and around passing elongated stock.

25. In a method of sheathing elongated stock with a cross-linked jacket made of polyethylene, wherein granular polyethylene is mixed with a metered quantity of silane or a silane compound at a ratio sufficient for grafting to obtain crosslinking in the presence of moisture, and wherein additives needed for grafting are added to the polyethylene, and wherein the mixture is worked at elevated temperatures above 140° to obtain a melted, homogenized viscous fluid having a temperature to obtain the grafting, the improvement of degassing the grafted viscous fluid at a low pressure; and immediately extruding the degassed fluid around the stock to obtain the jacket, the jacket cross-linking following the extrusion in the presence of moisture.

* * * * *

UNITED STATES PATENT AND TRADEMARK OFFICE
CERTIFICATE OF CORRECTION

PATENT NO. : 4,117,063
DATED : September 26, 1978
INVENTOR(S) : Hermann Uwe Voigt, Martin Völker, Hans Peter Stehmann It is certified that error appears in the above-identified patent and that said Letters Patent are hereby corrected as shown below:

[75] Hermann Uwe Voigt; Martin Völker, both of Langenhagen; Hans Peter Stehmann, Fuhrberg; all of the Fed.Republic of Germany

[73] Kabel- und Metallwerke Gutehoffnungshütte AG., Hannover, Fed.Republic of Germany

[30] Foreign Application Priority Data
December 12, 1974  Fed.Republic of Germany  2458776
July 1, 1975  Fed.Republic of Germany  2529260

Signed and Sealed this

Ninth Day of January 1979

[SEAL]

Attest:

RUTH C. MASON
Attesting Officer

DONALD W. BANNER
Commissioner of Patents and Trademarks